E. W. MOYER.
Axle-Lubricator.

No. 201,193. Patented March 12, 1878.

WITNESSES:
C. Neveux
C. Sedgwick

INVENTOR:
E. W. Moyer
BY Munn & Co
ATTORNEYS.

UNITED STATES PATENT OFFICE.

ELIAS W. MOYER, OF BERNVILLE, PENNSYLVANIA.

IMPROVEMENT IN AXLE-LUBRICATORS.

Specification forming part of Letters Patent No. 201,193, dated March 12, 1878; application filed January 28, 1878.

*To all whom it may concern:*

Figure 1:
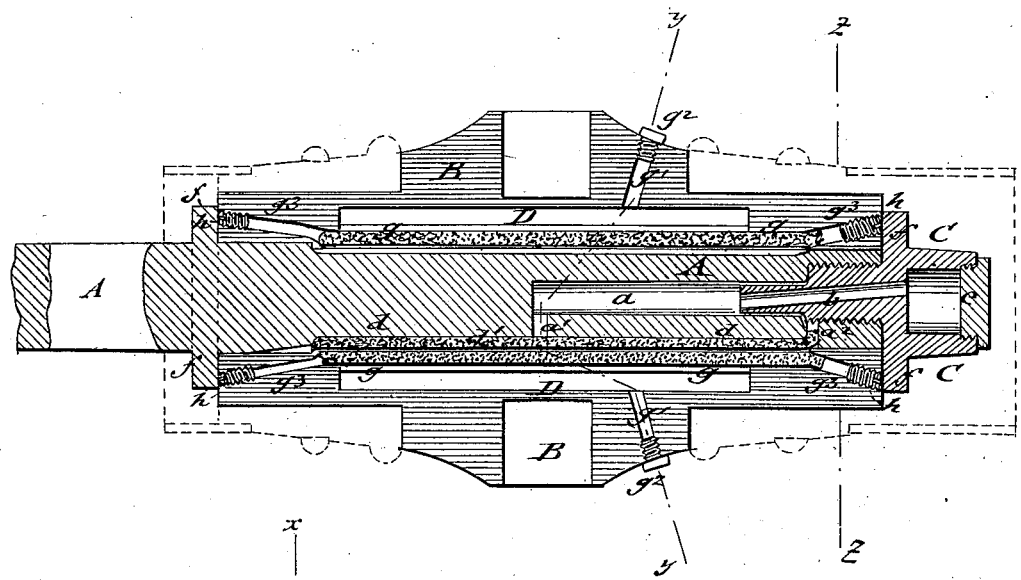
Figure 2:
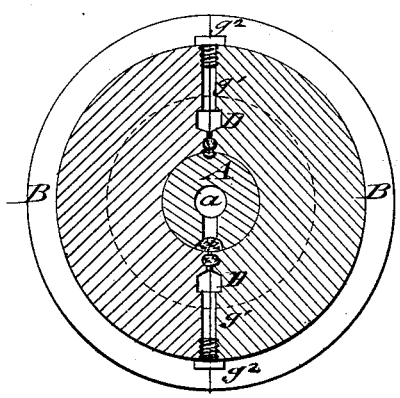
Figure 3:
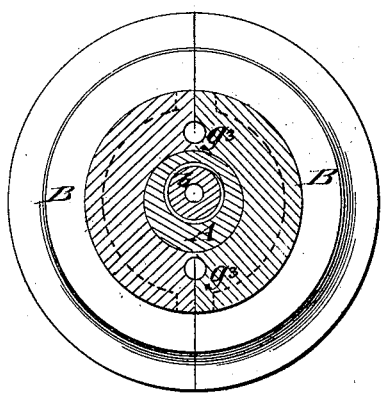

Be it known that I, ELIAS W. MOYER, of Bernville, county of Berks, and State of Pennsylvania, have invented a new and Improved Axle-Oiler, of which the following is a specification:

In the accompanying drawings, Figure 1 represents a vertical longitudinal section of my improved axle-oiler on line $x$ $x$, Fig. 2; and Figs. 2 and 3 are vertical transverse sections of the same on lines $y$ $y$ and $z$ $z$, Fig. 1.

Similar letters of reference indicate corresponding parts.

This invention relates to an improved mode of lubricating wagon-axles in effective and economical manner, and entirely free from dust; and it consists of a hollow axle with interior reservoir, exit-duct, and wicked grooves, in connection with a cap having an inclined oil-duct. The hub has interior longitudinal grooves and oil-receptacles with oil-supply openings and plugs.

Referring to the drawing, A represents the axle of a wagon or other vehicle, and B the hub of the wheel revolving thereon. The axle is made hollow at the outer end, so as to form a central reservoir, $a$, to which the oil is supplied through an inclined channel, $b$, of the hollow cap C. The cap C is screwed into the end of the axle, and extended into the reservoir $a$ of the axle. The reservoir $a$ connects by small exit-holes $a^1$ and $a^2$ with a longitudinal groove, $d$, of the axle, which groove is packed by a suitable oil-distributing wick, $d'$. The reservoir in the axle is filled from time to time, and supplies the oil from the inside to the longitudinal packing-wick. The cap C is also provided with a screw-plug, $e$, for supplying the oil to the axle-reservoir without removing the cap. The cap, as well as the axle on the opposite side of the hub, is provided with a flange, $f$, between which flanges the hub is retained.

The hub B is made of two sections, which are connected by bands, and provided with longitudinal grooves $g$ filled with wicks or other packing. Back of the grooves are arranged reservoirs D, of about the same length as the grooves, the reservoirs being filled by channels $g^1$, closed by plugs $g^2$. Inclined perforations $g^3$, at both ends of the hub, form extensions of the wick-grooves $g$ for the purpose of readily inserting and removing the wicks. The inclined perforations are closed by means of screw-plugs $h$, which are securely retained by the flanges of the axle and nut C, so as to be prevented from coming out. The oil is thereby confined in the reservoirs of the hub, and a uniform degree of lubrication kept up. The reservoirs of the hub, together with the supply of oil to the axle-wick, keep up the lubrication for a considerable length of time, to the exclusion of dirt and dust, and require but little attendance for refilling and rewicking the lubricating devices, forming thus an economical and reliable oiler for vehicle-axles.

Having thus fully described my invention, I claim as new and desire to secure by Letters Patent—

The combination of a hub, B, having inner longitudinal grooves $g$, supply-channels $g^1$, plugged extension-ducts $g^3$, and reservoirs D, with the vehicle-axle A and screw-cap C, having retaining-flanges $f$, substantially as and for the purpose specified.

ELIAS W. MOYER.

Witnesses:
EMENDON B. MOGEL,
WILLIAM UMBENHAUER.